US008196168B1

(12) United States Patent
Bryan et al.

(10) Patent No.: US 8,196,168 B1
(45) Date of Patent: Jun. 5, 2012

(54) METHOD AND APPARATUS FOR EXCHANGING PREFERENCES FOR REPLAYING A PROGRAM ON A PERSONAL VIDEO RECORDER

(75) Inventors: David Alan Bryan, Carmel, NY (US); Gilles Boccon-Gibod, Los Altos, CA (US)

(73) Assignee: Time Warner, Inc., New York, NY (US)

( * ) Notice: Subject to any disclaimer, the term of this patent is extended or adjusted under 35 U.S.C. 154(b) by 879 days.

(21) Appl. No.: 10/990,206

(22) Filed: Nov. 16, 2004

Related U.S. Application Data

(63) Continuation-in-part of application No. 10/733,521, filed on Dec. 10, 2003.

(51) Int. Cl.
*G06F 3/00* (2006.01)
*G06F 13/00* (2006.01)
*H04N 5/445* (2011.01)
*H04N 7/173* (2011.01)

(52) U.S. Cl. .......................................... 725/46; 725/134
(58) Field of Classification Search .................... 725/46, 725/134
See application file for complete search history.

(56) References Cited

U.S. PATENT DOCUMENTS

| | | | | |
|---|---|---|---|---|
| 4,700,386 A | * | 10/1987 | Kohn | 380/242 |
| 4,931,865 A | * | 6/1990 | Scarampi | 725/12 |
| 5,255,090 A | | 10/1993 | Israelsen | |
| 5,561,708 A | * | 10/1996 | Remillard | 379/93.19 |
| 5,805,155 A | | 9/1998 | Allibhoy et al. | |
| 5,850,218 A | | 12/1998 | LaJoie et al. | |
| 5,930,526 A | | 7/1999 | Iverson | |
| 6,031,572 A | | 2/2000 | Christopoulos | |
| 6,049,333 A | | 4/2000 | LaJoie et al. | |
| 6,175,831 B1 | | 1/2001 | Weinreich et al. | |
| 6,314,452 B1 | | 11/2001 | Dekel et al. | |
| 6,340,987 B1 | | 1/2002 | Hayashi | |
| 6,351,596 B1 | * | 2/2002 | Ostrover | 386/46 |
| 6,369,840 B1 | | 4/2002 | Barnett et al. | |
| 6,374,290 B1 | | 4/2002 | Scharber et al. | |
| 6,389,372 B1 | | 5/2002 | Glance et al. | |
| 6,493,876 B1 | | 12/2002 | DeFreese et al. | |
| 6,498,895 B2 | * | 12/2002 | Young et al. | 386/291 |
| 6,536,043 B1 | | 3/2003 | Guedalia | |
| 6,754,904 B1 | * | 6/2004 | Cooper et al. | 725/32 |

(Continued)

FOREIGN PATENT DOCUMENTS
WO WO 0065838 A2 11/2000
(Continued)

OTHER PUBLICATIONS

"TV's Future May Be Web Search Engines That Hunt for Video", The Wall Street Journal, Dec. 16, 2004.

*Primary Examiner* — Brian Pendleton
*Assistant Examiner* — Jonathan V Lewis
(74) *Attorney, Agent, or Firm* — Gottlieb, Rackman & Reisman, P.C.

(57) ABSTRACT

Personal video recorders (PVRs) contain many desirable features, including the ability to skip undesirable portions of a recorded broadcast program. Disclosed is a method and system for a PVR user to share with other users tags identifying desirable program portions or segments ("Hot-Spots") and undesirable segments ("Cold-Spots"). Other users are able to either automatically or manually to adjust the replay of the program based on the tags.

33 Claims, 9 Drawing Sheets

U.S. PATENT DOCUMENTS

| | | | |
|---|---|---|---|
| 6,813,775 B1* | 11/2004 | Finseth et al. | 725/46 |
| 6,947,966 B1* | 9/2005 | Oko et al. | 709/203 |
| 7,080,392 B1* | 7/2006 | Geshwind | 725/34 |
| 7,394,816 B1* | 7/2008 | Bill | 370/400 |
| 7,421,729 B2* | 9/2008 | Zenoni | 725/146 |
| 7,631,327 B2* | 12/2009 | Dempski et al. | 725/34 |
| 7,836,480 B1* | 11/2010 | Harvey et al. | 725/135 |
| 8,001,568 B2* | 8/2011 | Thurston et al. | 725/46 |
| 2001/0009037 A1 | 7/2001 | Komata | 725/133 |
| 2002/0013943 A1* | 1/2002 | Haberman et al. | 725/39 |
| 2002/0053084 A1 | 5/2002 | Escobar et al. | |
| 2002/0056088 A1 | 5/2002 | Silva | |
| 2002/0056123 A1* | 5/2002 | Liwerant et al. | 725/87 |
| 2002/0087978 A1 | 7/2002 | Nicholson et al. | |
| 2002/0123928 A1 | 9/2002 | Eldering et al. | |
| 2002/0124247 A1 | 9/2002 | Houghton | |
| 2002/0144262 A1 | 10/2002 | Plotnick | |
| 2002/0170068 A1* | 11/2002 | Rafey et al. | 725/112 |
| 2002/0184634 A1* | 12/2002 | Cooper | 725/51 |
| 2002/0194595 A1* | 12/2002 | Miller et al. | 725/36 |
| 2003/0014407 A1 | 1/2003 | Blatter et al. | |
| 2003/0018973 A1* | 1/2003 | Thompson | 725/47 |
| 2003/0026593 A1* | 2/2003 | Ostrover | 386/54 |
| 2003/0050977 A1 | 3/2003 | Puthenkulam et al. | |
| 2003/0093790 A1* | 5/2003 | Logan et al. | 725/38 |
| 2003/0131351 A1* | 7/2003 | Shapira | 725/24 |
| 2003/0145331 A1 | 7/2003 | Escobar et al. | |
| 2003/0149975 A1 | 8/2003 | Eldering et al. | |
| 2003/0172374 A1* | 9/2003 | Vinson et al. | 725/9 |
| 2003/0182567 A1 | 9/2003 | Barton et al. | |
| 2003/0208763 A1 | 11/2003 | McElhatten et al. | |
| 2004/0003118 A1 | 1/2004 | Brown | |
| 2004/0010807 A1 | 1/2004 | Urdang | |
| 2004/0015999 A1 | 1/2004 | Carlucci et al. | |
| 2004/0040035 A1 | 2/2004 | Carlucci | |
| 2004/0221308 A1 | 11/2004 | Cuttner et al. | |
| 2004/0231003 A1* | 11/2004 | Cooper et al. | 725/135 |
| 2004/0255321 A1* | 12/2004 | Matz | 725/14 |
| 2005/0005308 A1* | 1/2005 | Logan et al. | 725/135 |
| 2005/0193414 A1* | 9/2005 | Horvitz et al. | 725/46 |
| 2006/0015925 A1* | 1/2006 | Logan | 725/135 |
| 2006/0080717 A1* | 4/2006 | Barzilay et al. | 725/100 |
| 2006/0085818 A1* | 4/2006 | Bodlaender et al. | 725/46 |

FOREIGN PATENT DOCUMENTS

| | | |
|---|---|---|
| WO | WO 0110115 | 2/2001 |
| WO | WO 0110115 A1 | 2/2001 |
| WO | WO 0110118 | 2/2001 |
| WO | WO 0110118 A1 | 2/2001 |
| WO | WO 01/10118 A1 | 8/2001 |
| WO | WO 0161997 | 8/2001 |
| WO | WO 0177954 | 10/2001 |
| WO | WO 0177954 A2 | 10/2001 |
| WO | WO 0178401 | 10/2001 |
| WO | WO 0178401 A2 | 10/2001 |
| WO | WO 01/50742 A1 | 12/2001 |
| WO | WO 01/50753 A1 | 12/2001 |
| WO | WO 0235840 | 5/2002 |
| WO | WO 0237853 | 5/2002 |
| WO | WO 2004/004186 A2 | 1/2004 |

* cited by examiner

METHOD AND APPARATUS FOR EXCHANGING PREFERENCES FOR REPLAYING A PROGRAM ON A PERSONAL VIDEO RECORDER

This application is a continuation-in-part application of prior application Ser. No. 10/733,521, filed Dec. 10, 2003, to which priority under 35 U.S.C. §120 is claimed. This application is related to the U.S. patent application Ser. No. 10/835,834, filed Apr. 30, 2004 entitled APPARATUS, METHOD AND SYSTEM FOR INTELLIGENT ADVERTISEMENT, and it is herein incorporated by reference.

FIELD

This invention pertains to the control of personal video recorders (PVR). PVRs are devices used to enable recording of programs on a digital media both automatically and manually and to play back the programs. More specifically, the invention is presented that enables a user to selectively skip program portions that may be uninteresting and to repeat or slow down interesting program portions based on tags generated by other viewers and/or experts.

BACKGROUND

Modern technology has provided access to an ever-increasing abundance of television programs. The staggering volume of programs available from the over 200 channels of cable and satellite television, and soon, thousands of Internet sources presents almost limitless viewing options.

Because of their flexibility, advanced capabilities, and ease-of-use, digital technology-based consumer devices such as personal video recorders (PVRs) and personal computers with PVR functionality have begun to provide an alternative to VCRs as a means for recording television programs in the home. These devices provide features that allow users to watch programs when they wish.

SUMMARY OF THE INVENTION

The sheer amount of television content is a blessing to those whose interests or hobbies lend themselves to the many "narrow-cast" and special interest channels. It is a curse to those who have limited time or patience to find and watch specific programs or entertainment that they might find useful and/or appealing. In many cases, these are the same individuals. While PVRs are powerful tools to help manage content, they lack the ability to focus the attention of the viewer on only the most important or interesting segments of a program, and effectively avoid program segments that have little appeal (commercial messages, for example). As a result, a significant fraction of a viewers' time is still spent watching commercials and other parts of programs that are of little interest. For example, many people watch the entire evening news while interested only in the weather or sports segment. Others watch an entire sporting event, while only a few key plays are truly interesting.

For the foregoing reasons, there is a need for a method for sharing, among a group or community of television viewers, or between "experts" and viewers, information that would allow a television recording apparatus to offer the viewer the option to selectively play back only those portions of a program that were felt to be of particular interest ("Hot-Spots"), or, alternatively, play back an entire program with the exception of those portions that were felt to be particularly uninteresting ("Cold-Spots").

In one embodiment, one or more members of a group or community of television watchers create tag files regarding particular programs (regular series shows, movies, sporting events, and the like) that they watch. These tag files comprise tags of felt to be particularly interesting or valuable. Cold-Spots are portions of programs that were felt to be particularly uninteresting or worthless. In an alternate embodiment, an "expert" (television critic, subject matter specialist, commentator, etc.) creates the tag files designating the Hot-Spots and Cold-Spots of a program. These tag files may be freely distributed or offered for sale through the Internet (peer-to-peer, server-based, etc.), or a similar distribution means.

Hot-Spot and Cold-Spot tag files are created by users as they watch a television show through an appropriately equipped device (PVR, set-top box, personal computer, etc.). Users create tag files by expressing their interest in particular segments of the show by pressing selected keys on the device's remote control.

Other users, watching a delayed or recorded version of the same show through a similarly equipped device, use the tag file to alter playback of the show or display the Hot-Spots and Cold-Spots as indicators during playback. Various playback modes can be selected. These include a mode that automatically skips all of the Cold-Spots and a mode that automatically displays only the Hot-Spots or otherwise controls the playing of a program in accordance with the respective tags. The actual tags may designate a Hot-Spot or a Cold-Spot, or alternatively, they may carry a weighted value between some specific limits.

The tags are created either individually at specific PVRs and are then exchanged between watchers. Alternatively, tag files can be generated at a central server and then distributed. The central server then generates the tags based on information from several PVRs and, if necessary, applies some predetermined rules to the information.

These and other features of the invention will be more fully understood from the following detailed description of the embodiments, which should be read in light of the accompanying drawings.

In this respect, before explaining the invention in detail, it is to be understood that the invention is not limited in its application to the details of construction and to the arrangements of the components set forth in the description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be used as a basis for designing other structures, methods, and systems for carrying out the several purposes of the present invention. It is important, therefore, that the claims contemplate such equivalent constructions that are in the spirit and scope of the present invention.

BRIEF DESCRIPTION OF THE DRAWINGS

The accompanying drawings, which are incorporated in and form a part of the specification, illustrate embodiments of the present invention and, together with the description, serve to explain the principles of the invention.

DETAILED DESCRIPTION OF PREFERRED EMBODIMENTS OF THE INVENTION

Figure 1:
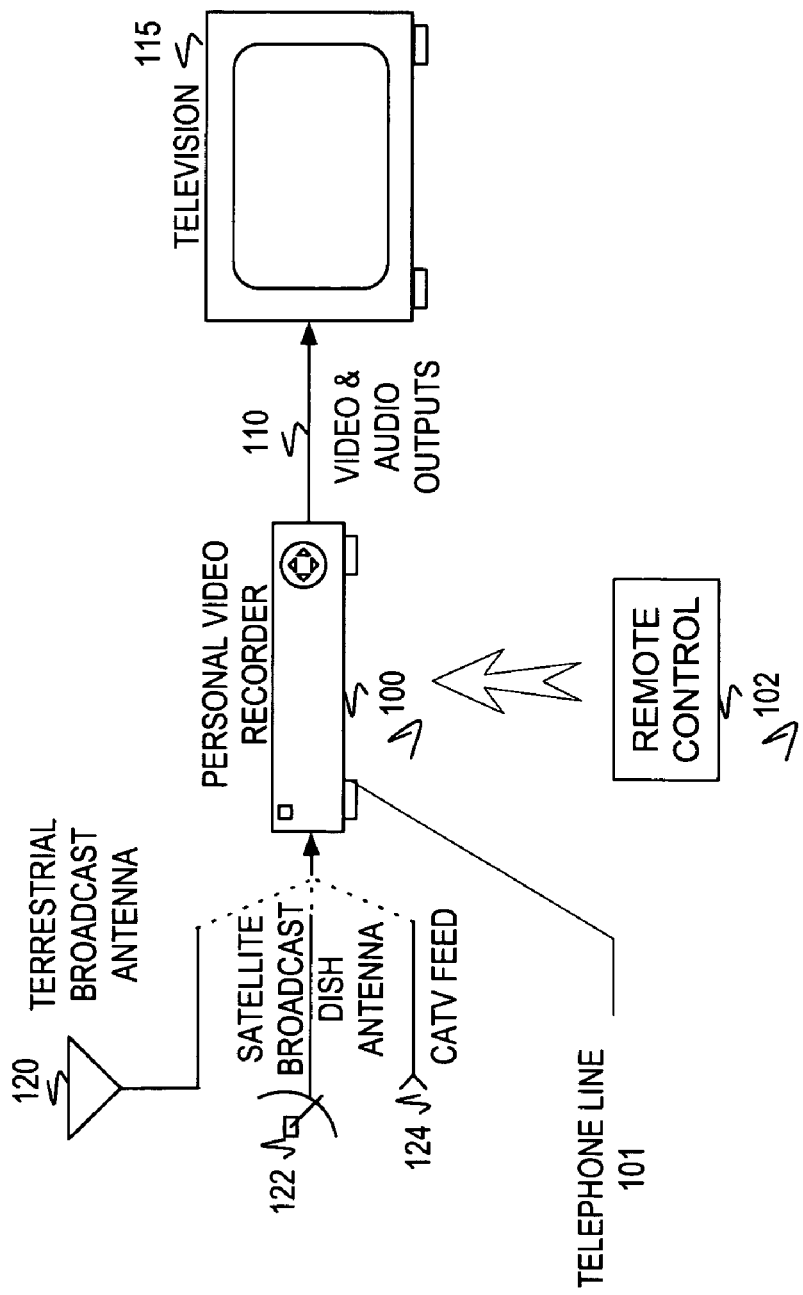
FIG. 1 illustrates a PVR installed in a scenario.

In describing an embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

FIG. 1 shows a PVR installation. Personal Video Recorder 100 receives a broadcast signal from one or more program sources. The sources of programs may include terrestrial broadcast, satellite broadcast, and cable television (CATV). These program sources are received respectively by a Terrestrial Broadcast Antenna 120, a Satellite Broadcast Dish Antenna 122, and a CATV Feed 124. A program source can comprise analog, digital or a combination of analog and digital programs. Video and Audio outputs 110 of Personal Video Recorder 100 are connected to Television 115 for user viewing of programs from Personal Video Recorder 100. Video and Audio outputs 110 may also be connected to another auxiliary device, such as a conventional videocassette recorder or digital videodisc recorder. In addition, the audio outputs may be connected to speakers (not shown) that are remote and separate from the Television 115.

The user controls the Personal Video Recorder 100 using Remote Control 102. Standard controllable functions may includes: changing channels; muting and adjusting the sound volume; pausing, fast forwarding and rewinding through programs; setting up the PVR to record programs; and selecting previously recorded programs for viewing.

In this description, a personal video recorder or a "PVR", can refer the traditional units available from, for example, TiVo, Inc. of Alviso, Calif. and ReplayTV (Digital Networks North America, Inc) of Santa Clara, Calif. or any other media recording device or set-top box with recording capability could use the concepts contained herein.

Figure 2:
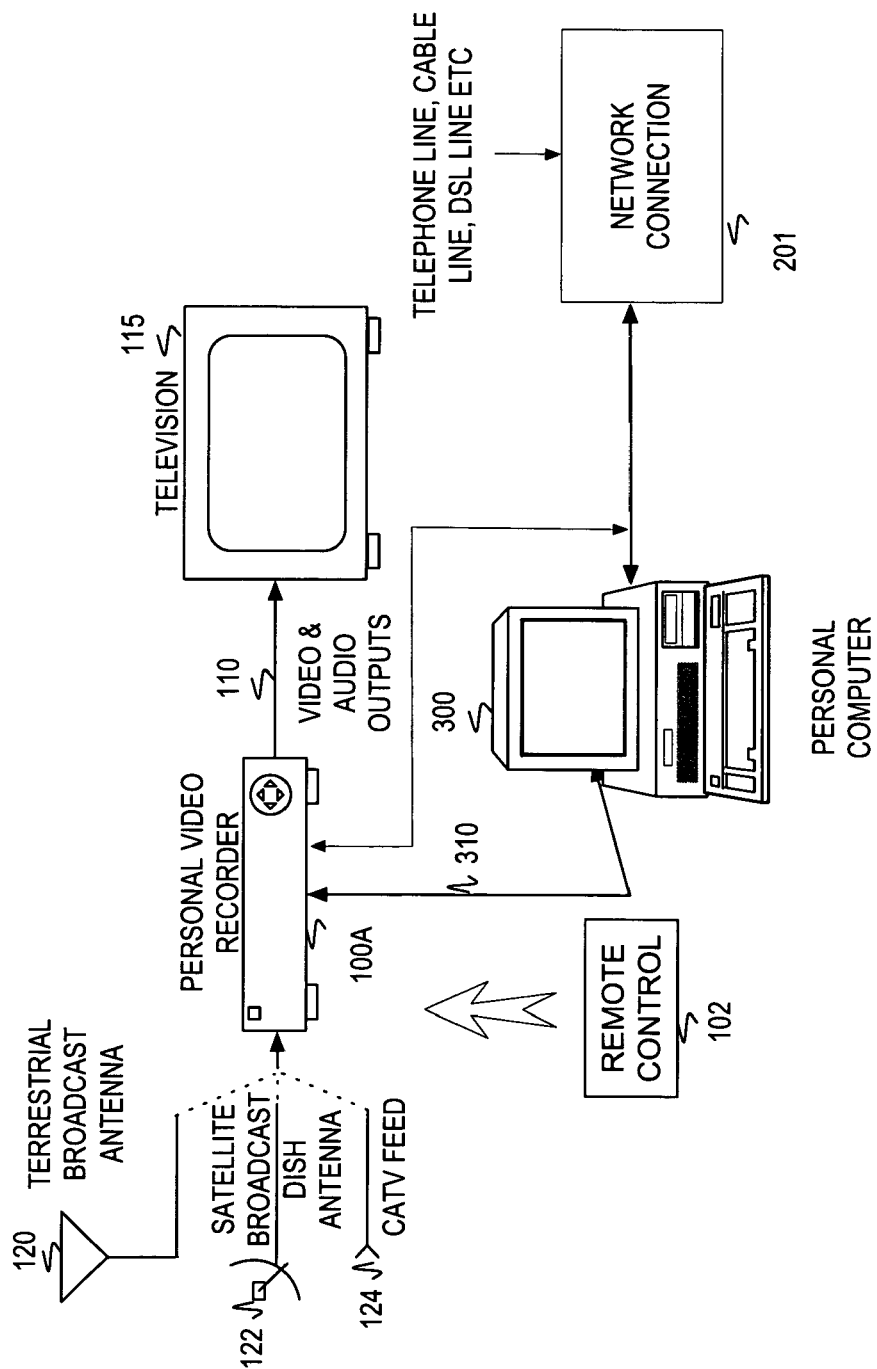
FIG. 2 illustrates a PVR that is connected to the Internet, either directly, or through a secondary device.

Standard PVRs include a telephone line modem (not shown) or network interface (e.g., an Ethernet port for broadband Internet connectivity) to allow the PVR to download program guide information and the like. The functionality of a PVR may be further enhanced by connecting it to the Internet to enable it to exchange information with other devices at remote sites, as discussed in more detail below. In one embodiment of the invention, the PVR itself is an Internet device, i.e., it incorporates a module (such as cable modem, WiFi adapter, etc.) that provides a direct Internet connection. FIG. 2 shows the connection of Personal Video Recorder 100A directly to the Internet through a network connection 201. Alternatively, as shown in FIG. 2 the Personal Video Recorder 100A is connected to an external Internet access device such as a personal computer 300 which is, in turn, connected to the Internet through network connection 201 and transmits information between the PVR 100A and other remote devices.

Figure 3:
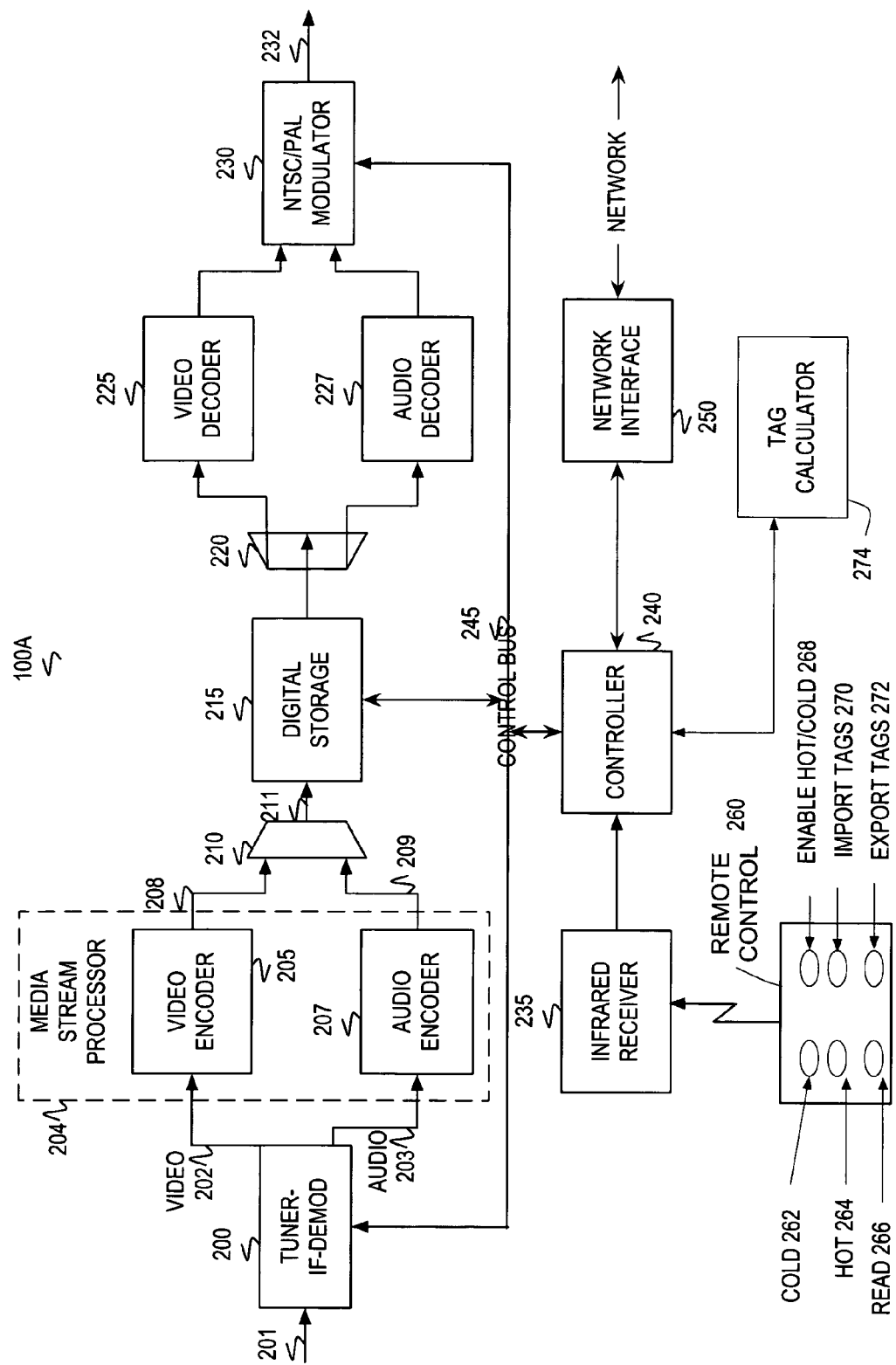
FIG. 3 shows a block diagram for the PVR of FIG. 2.

FIG. 3 is a simplified functional block diagram of Personal Video Recorder 100. The particular PVR illustrated in FIG. 3 is for use with analog television broadcasts (over-the-air or CATV, for example). The antenna/cable feed 201 is input to Tuner-IF-Demod 200. Tuner-IF-Demod 200 is the combined functionality of tuner, intermediate frequency (IF) processing, and demodulator. (When we refer, in this specification, to a "tuner", we are typically referring to the Tuner-IF-Demod combination.) These functions serve to tune the selected channel, filter and mix the selected channel to baseband, and demodulate the received signal into a video signal 202 and audio signal 203. The channel is selected by the user through an IR (infrared) remote control (not shown) through Infrared Receiver 235 and Controller 240. Controller 240 programs the channel in Tuner-IF-Demod 200 through a Control Bus 245.

Video signals 202 and audio signals 203 are processed by Media Stream Processor 204, which includes Video Encoder 205 and Audio Encoder 207. Video Encoder 205 digitizes (converts from analog form into digital form) and compresses video signals 202. Video Encoder 205 may use one of the many video compression algorithms such as those included in the standards commonly known as MPEG-1, MPEG-2, or MPEG-4, or a proprietary algorithm Audio Encoder 207 digitizes and compresses audio signal 203. Audio Encoder 207 may use one of the many audio compression algorithms such as those included in the standards commonly known as MPEG-1 (including the algorithm commonly called MP3), MPEG-2, or MPEG-4, or another algorithm. Video Encoder 205 and Audio Encoder 207 may also encrypt the media steams to protect them from unauthorized copying. The digitized video and audio signals 208 and 209 are multiplexed in multiplexer 210 and the multiplexed signal 211 is stored in a file on Digital Storage 215 under the control of Controller 240 through Control Bus 245. Digital Storage 215 may be any fixed or removable mass storage device, including a hard disk drive, an optical disk drive, flash memory, etc.

Playback comprises retrieving of a desired media file from Digital Storage 215, and demultiplexing the retrieved signals in demultiplexer 220. The demultiplexed video and audio signals are decoded by Video Decoder 225 and Audio Decoder 227. Video Decoder 225 and Audio Decoder 227 use the appropriate decompression algorithms based on those used in Video Encoder 205 and Audio Encoder 207. Video Decoder 225 and Audio Decoder 227 may also decrypt the media signals if they were encrypted during the encoding process. The outputs of Video Decoder 225 and Audio Decoder 227 are converted to a form that is appropriate for display on Television 115 by NTSC/PAL Modulator 230. The output signals 232 of NTSC/PAL Modulator 230 may include an RF modulated composite video and audio signal as well as separate video and audio signals. Separate video signals may include a baseband composite video signal, an S-Video signal, and a component video signal. Audio signals may include line level analog mono or stereo audio and S/PDIF digital audio signals. In one embodiment, a high-definition (HD) tuner and receiver are used, in which case the transmissions to not need to be digitized as they are already digitally encoded.

Controller 240 is responsible for managing all of the functions of Personal Video Recorder 100A and is also responsible for managing the files on Digital Storage 215. Included in the management of the files is the monitoring of free storage space, removal of unused or unneeded files, and prioritization of storage operations. Controller 240 is also responsible for acquiring, formatting and displaying an Electronic Program Guide (EPG) on television 115. Controller 240 may acquire the data required for the EPG from information carried on the broadcast signal or by downloading data through Network Interface 250 as discussed above. The Network Interface 250 is implemented either through a telephone modem, or as a direct or indirect Internet connection as illustrated in FIG. 2.

The EPG displays a listing of current and upcoming programs on all of the available channels. The user navigates the EPG, searches for programs, and selects programs to view or record by using an IR remote control 260 through Infrared Receiver 235.

Referring again to FIG. 3, Digital Storage 215 has a read/write bandwidth that is sufficient to effectively support simultaneous read and write operations. This allows a user, for example, to watch a previously recorded program while another program is being recoded.

Playback from Digital Storage 215 may be prompted by a request from the user. The user makes a playback request through an on-screen catalog of recorded programs.

In one embodiment, when a PVR user watches a television show, he/she creates information regarding his/her interest level in various segments of the show. More specifically, the IR remote control 260 is provided with a set of standard keys for generating the standard commands discussed above. In addition, the remote 260 also includes several keys provided for the selection of tags. For example, as seen in FIG. 3, the control 260 includes a 'COLD' key 262, a 'HOT' key 264, a 'READ' key, an 'ENABLE HOT/COLD' key 268, an 'IMPORT TAGS' key 270 and an 'EXPORT TAGS' key 272. The PVR 100A also includes a tag file generator 274.

The PVR 100A can have several modes of operation as determined by the user with the remote control 260. One mode is the standard mode in which the PVR 100A operates just like a standard PVR 100.

Another mode is a READ mode that is initiated with READ key 260. In this mode, as the user watches a program, he activates either the COLD key 282 or the HOT key 264, as described in more detail below. Activation of the either of the keys alerts the controller that a respective tag is to be generated for the portion of the program to be played. The controller 240 sends this information to the tag file generator 274 which generates a tag file. This tag file comprises tags (locations within a program) of HOT and COLD tags (e.g., the number of minutes and seconds into the program when the key was engaged).

In another embodiment, instead of using the explicit commands from the user, the HOT and COLD tags are inferred from other user actions. For example, if a user replays a segment, this segment is marked as a Hot-Spot, while if a user skips a particular program segment, this is inferred to be a Cold-Spot. Using the "slow motion" feature may also mark an area as a Hot-Spot.

In another embodiment, Hot or Cold spots can also be inferred and tagged based upon other less explicit user actions. For example, if the user carriers a wireless tag, a Cold spot can be inferred when the user leaves the room. Alternatively, a user's eye movements can be monitored to determine if he or she is paying attention to the events being depicted on the television screen. For really Hot-spots, the user's eyes will be "glued to the screen", whereas, for less interesting or repugnant segments, the user's eyes will tend to wander or "look down". Eye movement tracking through the use of a camera pointed at the user, along with camera image post-processing hardware or software, is known in the art. Alternatively, various biometric monitoring techniques known in the art of "lie detection" can be employed. For example, such factors as blood pressure, respiration rate, or galvanic skin response (GSR) can be monitored to establish a level of interest in the video by the viewer. In fact, such factors may prove more effective in "anticipating" Hot-spots than having a user press a button to mark the beginning of the Hot-spot. Pressing a button to indicate interest may be considered more of a conscious act, which typically involves some time delay for the viewer to "decide" that something viewed is interesting, whereas the biological factors previously mentioned tend to be more unconscious or reflexive, and may therefore prove more reliable in providing an early indication of Hot-spots. These factors will likely "ramp up" and "ramp down" as the viewer perceives the "temperature" of the viewing material to increase or decrease. As in the art of lie detection, if a baseline interest level can be reliably established (as it usually can), then thresholds can be established below which the material is perceived by the viewer to be uninteresting. Use of certain biological factors may only lead to an indication of interest/lack thereof, whereas in some embodiments it may be necessary to label certain segments of "high negative interest" (e.g., revulsion) as Cold-spots. In such cases, a second processing step can be employed to label such segments as Cold-spots, before the tags are forwarded to other users.

On some currently available PVRs, "Thumbs-Up" and "Thumb-Down" keys are provided on the remote control to enable the user to indicate their opinion of a particular show. In one embodiment, these keys may used to indicate Hot-Spots (Thumbs-Up) and Cold-Spots (Thumbs-Down) for segments within a show.

At the end of the program, the file is closed and the controller can either publish the file automatically, or in response to a command from the user. This command may be generated by activating the EXPORT TAGS key 272. The user can also request files for various programs by activating the IMPORT TAGS 270 key. Alternatively, the controller can import and store tag files automatically.

Figure 7:
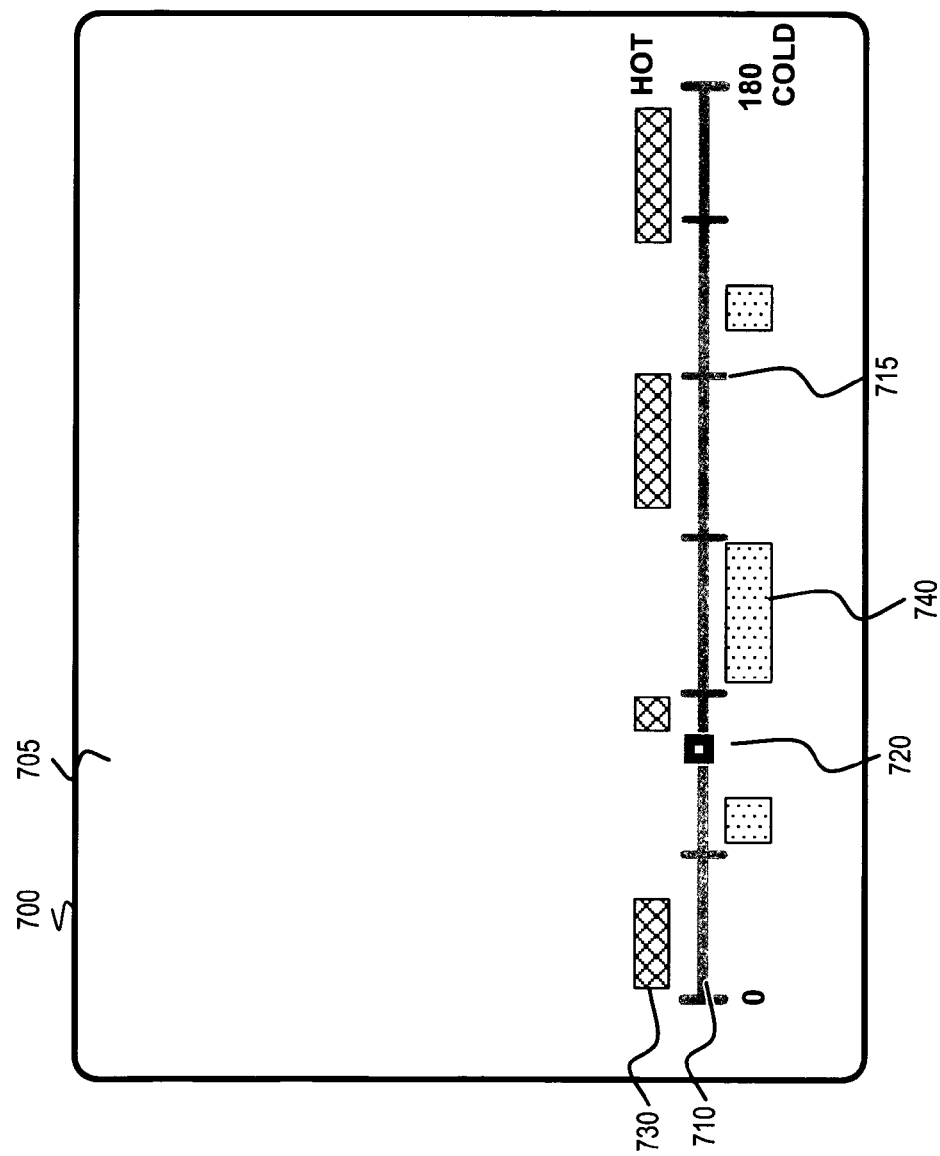
FIG. 7 illustrates Hot-Spot/Cold-Spot tags displayed in a binary fashion as a graphic overlay on a television screen.

In another mode of operation, at the beginning of a program that has been prerecorded by the PVR 100A (assuming that the tag file associated with the program is available) the user pushes the ENABLE HOT/COLD key 268 and controller 240 then replays the program in accordance with the tags, as discussed in more detail below in conjunction with FIGS. 7 and 8.

Figure 4:
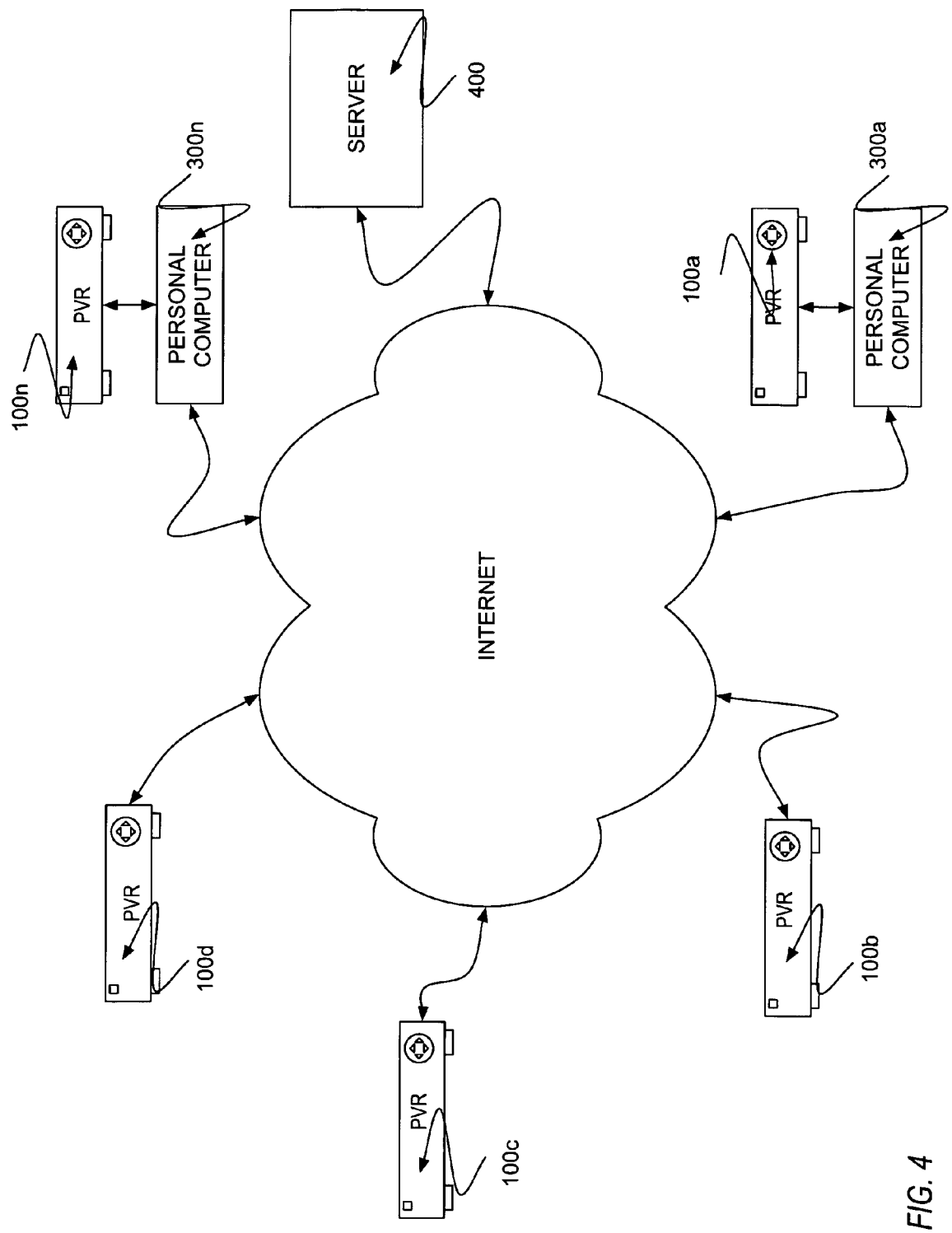
FIG. 4 illustrates a group of PVRs and a central server that are connected to the Internet.

The tag files can be shared by friends and relatives or using various peer-to-peer networks. As shown in FIG. 4, a plurality of PVRs 100a, 100b, 100c . . . 100n (with or without a personal computer, such as 300n) are interconnected by a distributed computer network such as an Internet and share tag files as described. Alternatively, or in addition, a central server 400 may be provided that collects and organizes, the tags associated with different programs from the different users. The server may process multiple sets of tags associated with different programs for the different users. The server may process multiple sets of tags for each program to produce a processed or filtered set of tags, as discussed below in conjunction with FIG. 9. This process may include removing duplicates, performing statistical operations like averaging, removal of outliers, voting or any other desired operation. The processed tags are then published to all the users, a subset of users, or to other users that do not provide information.

A program tag (i.e., program link) can be communicated to a PVR by a variety of other methods and mechanisms.

In one embodiment, the users DVR runs a web server and is attached to their home network, which is accessible over a communications network. In such an embodiment, the user engages the program link and their browser would contact the DVR. The DVR would be known to the user's computer by way of a preference setting (e.g., by providing an IP address for the DVR) and therefore the user would not have to re-enter the DVR address every time they engage a program link. In another embodiment, the DVR is provided with its own email address and is capable of reading emails. In such an embodiment, engaging a program link generates an email addressed to the users DVR and results in program scheduling.

In another embodiment, each DVR is allocated a network address (such as an IP address) which is long-lived or permanent. In such an implementation, the recipient DVR can be identified by its IP address and a server task can execute on the DVR to listen for and receive incoming programming links. As a variation, each DVR can be identified a symbolic identifier (such as a hierarchical domain name in the Domain Name System). The network address of a DVR can be resolved based on its symbolic name using a name service, which may take the form of a centralized server, a system of replicated servers, or as a more concrete example, a system of DNS servers.

If DVRs do not have long-lived network addresses, other means of communicating programming links are still possible. In one implementation, each DVR is identified by a symbolic identifier. A name service (which may be implemented in many ways, including, among others, centralized, replicated, distributed) is used to resolve the symbolic identifiers into network addresses. Each time the network address of a DVR changes, the DVR will report its new network address to the name service, thus keeping the latter up-to-date. Such a system will function like dynamic DNS or certain instant messaging (IM) systems.

In another embodiment, a server or a system of servers with sufficiently high availability can be used to receive programming links on behalf of DVRs. Each DVR will periodically connect to one or more such servers to retrieve programming links addressed to it. Such a system can function like an email system. In fact, an email system can be adapted for such purpose. In such an implementation, a DVR will function as a client to one or more email servers.

As an aspect of possible implementations, each DVR is associated with a unique or almost certainly unique identifier. A unique identifier may be derived from, for example, the MAC address of the Ethernet interface of the DVR, if Ethernet is used for networking purposes. Likewise, a unique identifier may be derived from unique identifiers that are allocated or generated for other purposes, such as the combination of model and serial numbers of the DVR itself. Almost certainly unique identifiers can be locally generated based on random locally available sources of randomness. So long as the identifier is long enough and a sufficient amount of entropy is sampled, the resulting identifier can be made practically unique. The analysis of the required amount of entropy and the probability of generating a non-unique identifier is well understood and requires only elementary skills in probability theory.

In an embodiment with a centralized server approach, clicking a programming link, e.g., on the web page of a chat room, may initiate contact with a server at a well-known address. That server may contact the machine of the user who initiated contact with the server to retrieve a cookie which contains a unique identifier of that user's DVR. Any of the above techniques may then be used to resolve the address of that user's DVR. It is also possible to route links to a user's DVR without the involvement of a centralized server, as described below.

As yet another way of routing a programming link to a DVR, DVRs can be arranged in a peer-to-peer (P2P) network, in which each DVR is in direct communication with a small number of other DVRs. The DVR with a given (almost) unique identifier can be located and contacted using broadcast-based searching in the prior art.

For example, the file-sharing programs have completely decentralized and distributed architectures, meaning that there are no central servers and that all computations and interactions happen between clients. All connections on the network are equal. When a client wishes to connect to the network they run through a list of nodes that are most likely to be up or take a list from a website and then connect to how ever many nodes they want. This produces a random unstructured network topology. Routing in the network is accomplished through broadcasting. When a search request arrives into a client that client searches itself for the file and broadcasts the request to all its other connections. Broadcasts are cut off by a time to live that specifies how many hops they may cover before clients should drop them rather than broadcast them. Searching on a decentralized network is accomplished by creating a keyword string that describes the file you want and broadcasting that string to all your connected neighbors. Your neighbors will then in turn broadcast that message to all their connected neighbors and so on until the packet's TTL has been reached.

Another architecture follows a 2-tier system in which the first tier consists of fast connections to the network (Cable/DSL and up) and the second tier consists of slower connections to the network (modem and slower). Clients on the first tier are known as SuperNodes and clients on the second tier are known as Nodes. Upon connection to the network what happens is that the client decides whether you are suitable to become a SuperNode or not. If you can become a SuperNode, you connect to other SuperNodes and start taking connections from ordinary Nodes. If you become a Node you find a SuperNode that will allow you to connect to them and connect. Routing on a 2-tier P2P network is accomplished by broadcasting between the SuperNodes. For example, when a Node issues a search request to the SuperNode it is connected to, the search request is taken by that SuperNode and then broadcast to all the SuperNodes with which it is communicating. The search continues in this way until its time-to-live (TTL) has reached zero. Every SuperNode that it reaches searches an index that contains all the files of its connected Nodes. Replies are routed back along the path that they came from until they reach the clients that originally issued them. A possible problem with this type of routing is that clients making up the backbone may connect and disconnect sporadically, which means that it may not always be possible to route packets back along the path that they came from.

Figure 5:
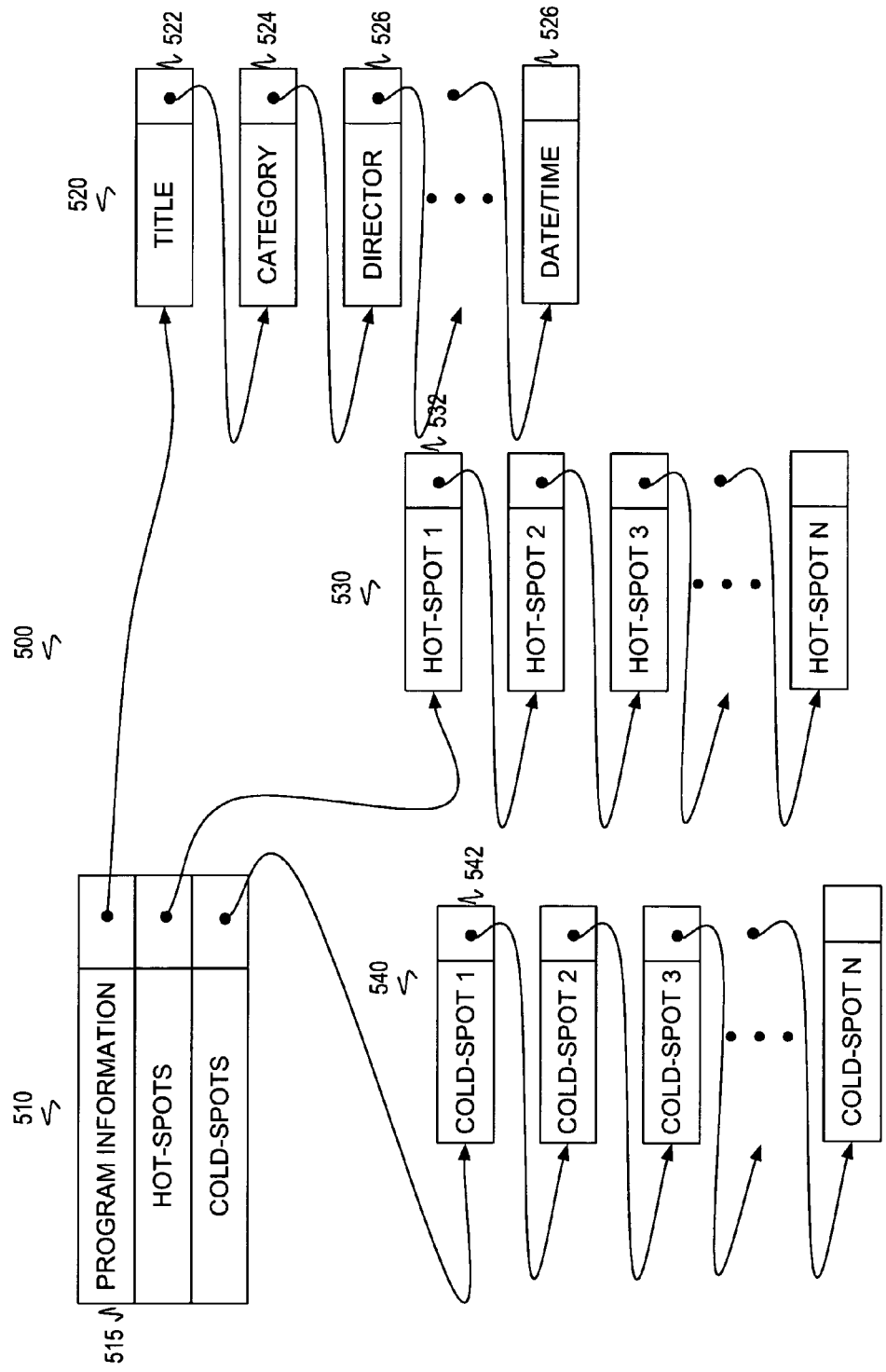
FIG. 5 illustrates an exemplary data structure for storing program identifying information along with Hot-Spot and Cold-Spot tag files.

The following is a more detailed description of how tag files are created. When a user watches a show, a temporary data structure is created by the tag file generator 274. An exemplary data structure is illustrated in FIG. 5. Data structure 500 is organized as a group of linked lists. The heads of each list 510 are pointers to the list of Program Information 520, Hot-Spots 530, and Cold-Spots 540. A specific example is the Program Information head pointer 515, which points to the Title data element 522 that includes the program title and a pointer to the next data element, which in this case is the Category data element 524, which in turn points to the Director data element 526. This linking sequence ends, in the example, with the Date/Time data element 528. The Program information may also include other data elements, such as cast and crew, program rating, etc. Program category may include situation comedy, movie, sporting event, history, cooking, and the like. In another embodiment, the datastructure is an XML formatted structure with XML tags acting as fields, and values are then set to the XML tags.

Figure 6:
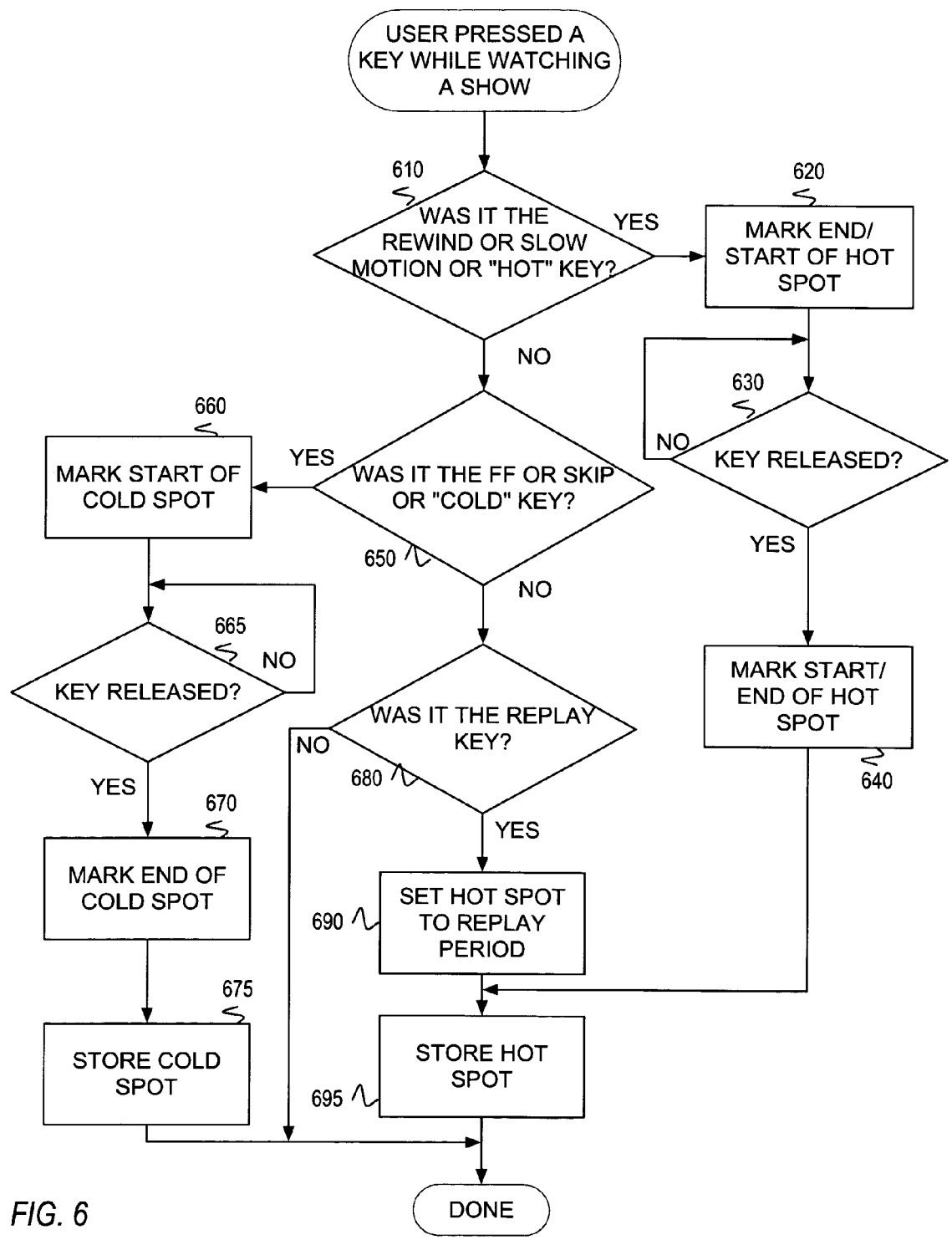
FIG. 6 is a flow chart showing how Hot-Spots and Cold-Spots are created by a user.

FIG. 6 is a simplified flowchart that illustrates how Hot-Spots and Cold-Spots may be created by the user during program viewing. The process described by the flowchart begins when the user presses a respective key on Remote Control 102. The process 610 first checks if the user pressed the Rewind, Slow Motion, or the Hot key 264. If one of these keys was pressed 620, the time is marked as the beginning (in the case of the Slow Motion and Hot keys) or end (in the case of the Rewind key). The process then waits for the key to be released 630. When the key is released, the release time is marked 640 as either the end (in the case of the Slow Motion and Hot key) or the beginning (in the case of the Rewind key) of the Hot-Spot. The tag is stored in the temporary data structure for the program being viewed 695. Alternatively, if the length of the period being tagged is long 630 the process ignores when the key is released and waits for the respective key to be pressed again. For example, for explicit tagging, the user can activate the HOT key to indicate the beginning of the period, and then activate the HOT key again for the end of the period.

If the user did not press the Rewind, Slow Motion, or Hot key, the process 650 next checks if the user pressed the Fast-Forward (FF), Skip or Cold key 650. If one of these keys was pressed, the time of the key press is marked as the start of a Cold-Spot 660. The process then waits for the key to be released 665. When the key is released, the release time is marked 670 as the end of the Cold-Spot. The Cold tag is then stored in the temporary data structure for the program being viewed 675.

If the user did not press the Fast-Forward (FF), Skip or Cold key 650, the process checks if the user pressed the Replay key 680. The Replay key causes the PVR to go back a fixed time period (8 seconds, for example), and automatically replay the program from that point onwards. If the Replay key was pressed, the entire replay period is marked as a Hot-Spot 690 and the Hot-Spot is stored in the temporary data structure for the program being viewed 695. If the user did not press the Replay key, the process exits with no Hot-Spot or Cold-Spot index created.

A feature of the PVR is the "pause" feature, which allows the user to pause the program being viewed. Frequently, this feature is used because the viewer is distracted (e.g. by a phone call) or must temporarily leave the viewing area (e.g. get a snack). Some users may also pause a program during segments of particular interest. In one embodiment, when a user rewinds or replays a segment and pauses at a particular scene within the segment, the segment is assumed to be of particular interest and is marked as a Hot-Spot. In one embodiment, if the pause is for a prolonged period of time, no hot spot is assumed to exist; alternatively, if the pause is for less than a specified period of time, a Hot-Spot is assumed to exist. For example, if a user has paused the program for more than 2 minutes, it may be assumed that the user was interrupted and not particularly interested in the scene. However, if the user pauses for less than 2 minutes, it may be because they were examining a scene carefully (e.g., examining where the knock-out punch landed during a boxing match).

There are many enhancements possible to the process illustrated in FIG. 6. In one embodiment, the Hot-Spots and Cold-Spots recorded by a user include a level of interest (in the case of a Hot-Spot) or disinterest (in the case of a Cold-Spot) for a particular segment of the program. For example, conventional PVR units have several fast-forward modes. The weighting of a Cold-Spot can be based on how fast the user skips over a program segment—faster skipping would equate to lower level of interest (higher level of disinterest). In one embodiment, the Hot and Cold keys are pressure sensitive and registered increased values with greater pressure.

As discussed above, at the end of a program, if any Hot or Cold tags were marked by a user, the data stored in the temporary data structure is consolidated into a tag file uploaded to central server 400 or, in an alternate embodiment, shared, on a peer-to-peer basis, with other users. In another embodiment, tags are distributed to other users, through a centralized server or in a peer-to-peer network, immediately upon being generated enabling a user to view a program while gaining the benefit of the tags to, for example, skip commercials, commentator banter, and other uninteresting portions of a program.

Figure 9:
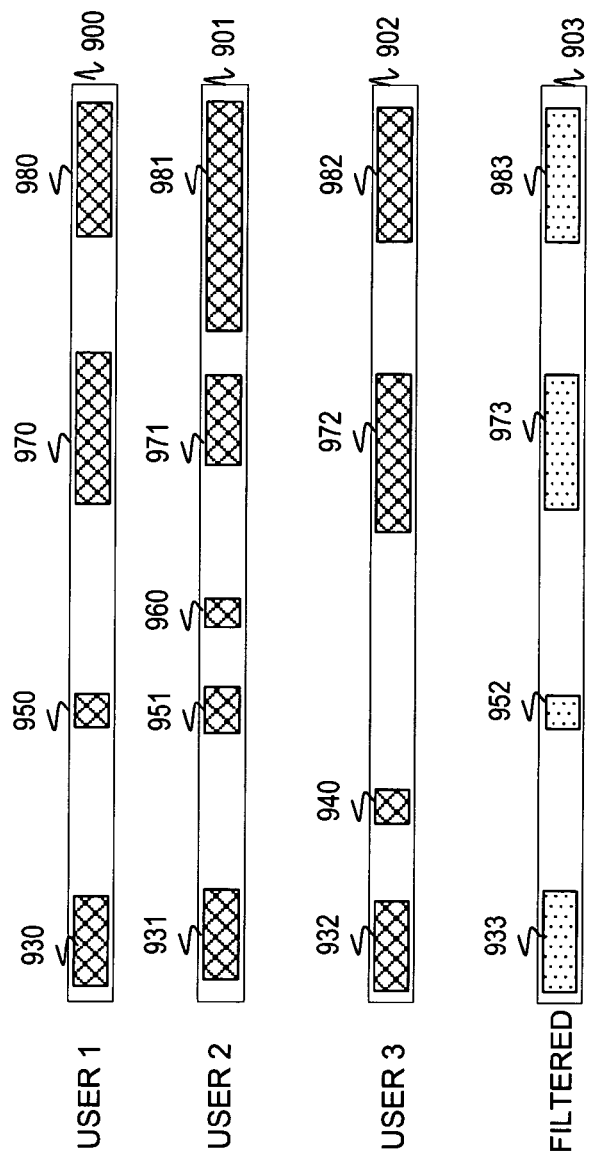
FIG. 9 shows several processes used to generate a composite or filtered tag file from tag files of different users.

When multiple tag files for each program are available, the server or receiver (in the case of peer-to-peer sharing of tags) processes the tags to produce a processed tag file. FIG. 9 shows an example of how Hot-Spots for a particular program are processed in one embodiment. Tags 900, 901, and 902 graphically represent sets of Hot or Cold tags from User 1, User 2, and User 3 respectively. Tags 903 graphically represents a filtered or processed tag for the same program, based on the tags from User 1, User 2, and User 3. The filtered tag 933 is generated by using the earliest start time and the latest end time of the three users. This processing is appropriate when multiple tags are closely matched, and have only slight start/end time mismatches. A voting process eliminates tag 940 from User 3 and index 960 from User 2—that is, no other user has marked these spots. Preferably, this voting process is used when only a very small number of users mark a particular segment. The filtered tag 952 is generated by a combination of voting and by using the earliest start time and the latest end time of the users. The start and end times of filtered tag 973 are based on the average of tags 970, 971, and 972. However, note that averaging is only appropriate in embodiments where it can be accomplished very quickly, such as embodiments where there is only a small number of taggers (e.g., three in the above example), and/or in embodiments in which a buffer delay sufficient to accommodate delay of the above tag processing is provided. In cases where no buffer delay is provided at the PVR, the time required to perform the above processing plus the time required to transmit the tags to the PVR must in total be less than the time which is perceived to "clip" too much video at the beginning of hot spots or the end of cold spots. Thus, when the processing of multiple tags is performed it is preferable to provide some minimal buffer delay capacity to the user. The minimal buffer delay capacity need only be sufficient to accommodate the above-mentioned processing and transmission delays as short as a second (or a few seconds) will suffice. Such a short buffer delay can be easily implanted using semiconductor memory and enable utilization of the tags without a PVR device.

In another embodiment, one or more individuals acts as a real-time, or near-real-time, editor and provides hot spot and/or cold spot information to PVR users immediately with a television program that is viewed with a minimal time delay. The editor tags various program portions of interest as hot spots and various program portions that are not interesting as cold spots, and the tagged program causes users' PVRs to display or record hot spots or to stop displaying or stop recording cold spots. This service can be provided as a fee based service, provided for owners of specific hardware, subscribers of a PVR or television source service, or for free access to the public.

In another embodiment, various tags are given weights. For example, a user sets certain individuals (other PVR users) as "buddies". The tags collected from "buddies" are given more weight than the tags collected from other users. In embodiments where the amount of time to act upon tags (including processing time plus transmission time) must be kept small, the processing performed at the processing site can be as simple as choosing the first tag to arrive. However, preferably the processing comprises of choosing to have the first tag arrive from a source whose information is trusted by the PVR user to which the tag is directed. Such a trusted source may include, but is not limited to, a buddy. In yet another embodiment, other users can be rated based upon their individual viewing habit similarities. This may include, but is not limited to, comparing Hot-Spots/Cold-Spots of previously viewed programs, or the number of programs viewed in common. The tags collected from users having more similarities can be given more weight than the files from users who have fewer similarities. However, it should be noted that it is preferable that this rating process is conducted "off-line", before the ratings are needed for directing tags to the appropriate PVR users. In addition, the different tags may be given weight as well. In other words, a Cold-Spot may be graded from 1-5 and a Hot-Spot may be graded from 1-5. When displaying and/or recording a program a controller may be set to act only tags having values above, or below some predetermined thresholds. In one embodiment, the server 400 is used to assign each tag a weighted value by averaging the tag values from the different users, by taking the peak value, or by using other criteria. However, note that in this embodiment, the server must be able to perform such tag processing fast enough to enable real-time or near-real-time requirements of the tag-forwarding process.

The tag files are used in a number of ways. In one embodiment, the tag files are displayed as a graphic overlay on the television screen as part of the playback display presented by the PVR. In one embodiment, illustrated in FIG. 7, the Hot-Spots and Cold-Spots are indicated in a binary fashion (Hot-Spot/Cold-Spot present or not). Referring to FIG. 7, television display 700 is presenting the video output 705 from the PVR, along with a graphic overlay that includes: timeline 710 for the current program with thirty minute indicators 715, current position indicator 720, Hot-Spot indicators 730 and Cold-Spot indicators 740. Using this mode, the user may manually fast-forward to skip over Cold-Spots indicated by 740 or rewind the program to replay Hot-Spots indicated by 730.

Figure 8:
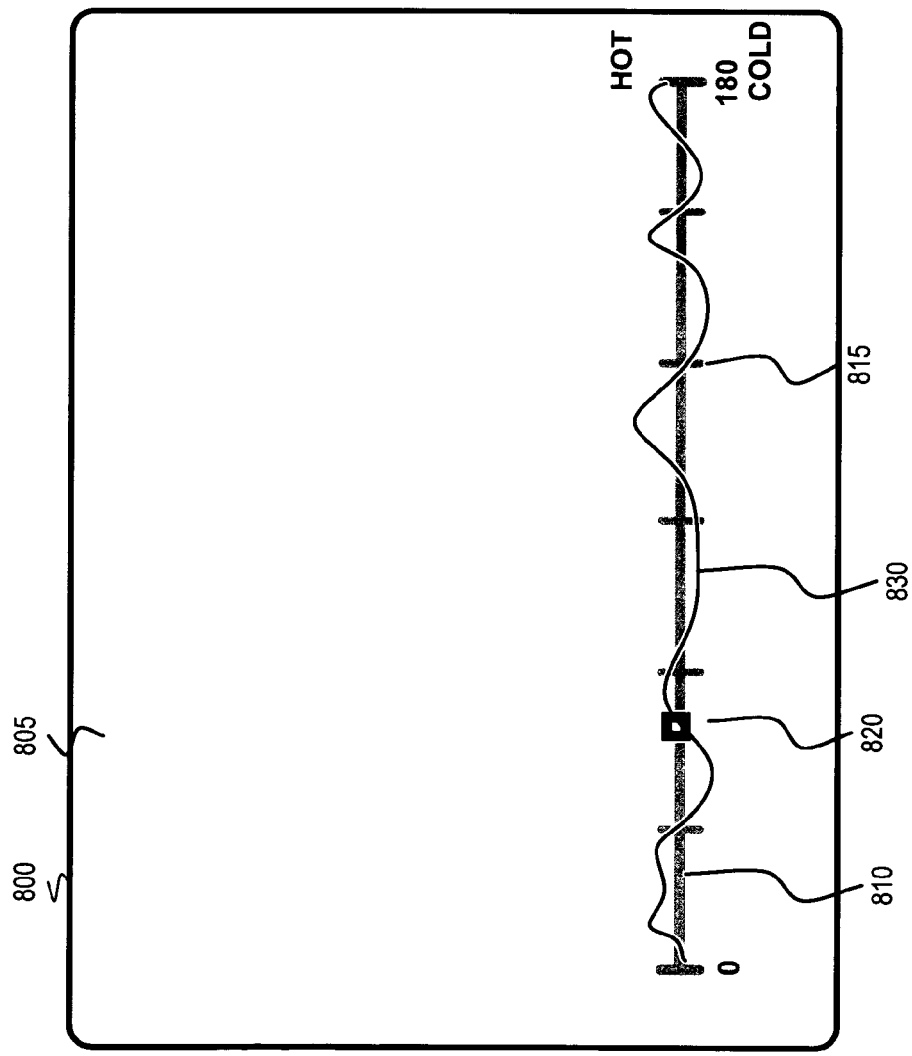
FIG. 8 illustrates Hot-Spot/Cold-Spot tag files displayed in an analog fashion as a graphic overlay on a television screen.

In another embodiment, illustrated in FIG. 8, the Hot-Spots and Cold-Spots are indicated in an analog fashion, wherein the magnitude of interest or lack of interest is indicated directly. Referring to FIG. 8, television display 800 is presenting the video output 805 from the PVR, along with a graphic overlay that includes: timeline 810 for the current program with thirty minute indicators 815, current position indicator 820, and Hot-Spot/Cold-Spot magnitude indicator 830. In yet another embodiment, the Hot-Spot/Cold-Spot tags are used by the PVR to automatically skip portions of the program. For example, in one mode, the PVR would be instructed to skip all Cold-Spots (for example, to skip all commercials). In another mode, the PVR would play only Hot-Spots (the highlights of a program). Many other ways of using the Hot-Spot/Cold-Spot tags to achieve a heightened user experience exist, including various modes of skipping and fast-forwarding through Cold-Spots, playing and repeating Hot-Spots, etc.

In another embodiment, the playback speed of the PVR is explicitly specified by the value of the tag associated with any given time interval of the program material. For example, a user may receive a previously recorded football game that has hot spots and cold spots assigned by an expert, such as sports commentator or football coach. The expert assigns cold spots to portions of the programming that have little interest, such as time outs, huddles and commercial breaks, and assigns hot spots to various parts of the program including key plays and formation shifts. During playback, the cold spots are played back at various high speeds, such as 16-times normal speed for timeouts, 8-times normal speed for huddles, and 4-times normal speed for uninteresting plays; while the hot spots are played back at normal speed for plays of average interest, ⅛ normal speed for an interesting play and 1/16 speed for a play of particular interest. This "slow motion" playback allows the viewer to dissect the most interesting portions of the program and to use the device as a teaching tool. The playback speeds specified by the tags are default speeds, but the PVR user can override the selected speeds and use any desired speeds. Also, the speeds provided are exemplary only and any desired speed can be utilized to enable desired viewing.

In another embodiment, a program that is viewed with the cold spots removed, or alternatively, all the material other than hot spots removed, is displayed or played back with the original program time base, but with the cold spot (or cold spot and non-hot spot) frames replaced by frames of another program. In this embodiment, the original program material is referred to as foreground material while the program material that replaces is referred to as background material. For example, a subscriber to "NFL Sunday Ticket" is watching a football game on a television connected to a PVR that has Internet access. The subscriber is viewing the game with a minimal delay line buffer and the PVR receives over the Internet hot spot and cold spot information on all of the football program material that is currently available via the NFL Sunday Ticket. Upon receiving notification of an impending cold spot, such as a time-out or commercial break, the foreground material is automatically replaced by the PVR with background material that is recorded from a different football game, enabling the subscriber to view exciting plays from many different football games without having to "channel surf". In an alternative embodiment, smart ads (as noted in a related U.S. patent application Ser. No. 10/835,834, filed Apr. 30, 2004 entitled APPARATUS, METHOD AND SYSTEM FOR INTELLIGENT ADVERTISEMENT), may be interspersed into the Cold-Spots.

The background material is not limited to material from concurrently broadcast programs. The background material may be a previously-stored program, an alternative advertisement, a lengthy advertisement such as an "infomercial", previously accumulated stored hot spot video accumulated by the current viewer and stored in the viewer's PVR, hot spot video tagged by other PVR users, interesting video clips previously stored by the user, or short entertainment programs such as music videos. The PVR provides the user with an option with the background material to play back only the video portion of the background material, only the audio portion of the background material, or both the audio and video portion of the background material.

In another embodiment, a group or community of television watchers, possibly with similar tastes in programming, is organized through one or more on-line community modalities, including peer-to-peer sharing, Instant Messaging, chat-rooms, Web-Logs (blogs), and other equivalent means. The individual user's PVR would perform the processing shown in FIG. 6, as described above. In this embodiment, tag files for programs are shared among members of the community with or without the use of a centralized server. The information may be shared by file transfer, instant messaging, email exchange, insertion into a blog, or other equivalent means. As these files are received, they may be processed to refine the indications of Hot-Spots and Cold-Spots as described above.

As above, when a member of the community watches a recorded program that others have already watched, and for which tag files have been received, the user's PVR, in one embodiment, displays this information on the television screen or, in an alternate embodiment, automatically uses the information to skip unwanted parts of the program. In yet another embodiment, a Hot-Spot key on the remote is used to skip to the next Hot-Spot. A member who views a program using tag files may add their own indications to the collected data, including adjustments to previous indications and new Hot-Spots and Cold-Spots.

In another embodiment, the individual(s) who create tags are experts. These experts may be television or movie critics, subject matter specialists (e.g., a football coach, a sport commentator), or others with specific knowledge of particular program material. The tags from experts may be made available in the same manner as discussed above (shared in a peer-to-peer or server-based network), or may be offered for sale or offered as part of a subscription service. An example is a service for watching sporting events that have been tagged by a professional coach or sports commentator. A user can view such an event in a manner similar to that of one of the team's coaches. This embodiment is well suited for real-time or near-real-time tagging because the expert is a trusted source, and processing such as averaging is not necessary enabling any buffer delay to be kept to a minimum. However, it may be preferable to include some buffer delay at the PVR because even an expert requires some time to decide whether to tag some portion of the video as a Hot-Spot or Cold-Spot. In instances where the transmission of the programming is normally delayed (such as ten second delay for "live" events) and the expert is able to view and tag the program in the delay period, no buffering at the PVR may be required. In an alternative embodiment to accommodate the delay in the tagging process, a minimal delay, such as one or two seconds, in program re-transmission may be provided at the programming source headend (cable TV or satellite service).

The many features and advantages of the invention are apparent from the detailed specification. Thus, the appended claims are intended to cover features and advantages of the invention. Further, since numerous modifications and variations will readily occur to those skilled in the art, it is not desired to limit the invention to the exact construction and operation illustrated and described. Accordingly, all appropriate modifications and equivalents may be included within the scope of the invention.

Although this invention has been illustrated by reference to specific embodiments, numerous changes and modifications may be made and are contemplated as being within the spirit and scope of the invention. The invention is intended to be protected broadly within the spirit and scope of the appended claims.

What is claimed is:

1. In a system for sharing television program viewing experiences between users of an electronic user community, said users of electronic user community sharing some viewing interests, wherein users watch portions of a program, generate a user rating for said portions indicating the opinion of the users of the respective portions and a tag is generated for each portion based on the respective user ratings, a method of presenting a program to a first user of said electronic user community, the method comprising:

receiving a program by a program player device associated with said first user, said device including a screen for presenting said program to said one of said users, said program including a first portion and a second portion following said first portion;

receiving by said program player device a first and a second tag associated with said first and second portions, respectively; and generating a graphic overlay on said screen, said graphic overlay being partially overlapped on said screen while said first portion of said program is shown wherein at least during said first portion, both said first portion and said graphic overlay are shown to said one user simultaneously, said graphic overlay representing said first and said second tags to indicate to said one user how the other users of said electronic user community have rated said second portion.

2. The method of claim 1, further comprising the step of:

determining if said tags correspond to one of a first and a second value defining whether users of the community like said second portion; and altering how the program is played by said device based on said determination automatically in accordance with the values of said tags.

3. The method of claim 2, wherein altering how the program is played includes skipping one or more segments of the program.

4. The method of claim 2, wherein altering how the program is played by the device includes playing segments of the program that are indicated as desirable based on whether the tags have said first value.

5. The method of claim 2, wherein altering the program playback is performed automatically by a personal video recorder.

6. The method of claim 2, wherein altering the program playback includes altering the playback speed of selected segments of the program automatically, without any input from said first user.

7. The method of claim 6, wherein the altering the playback speed includes increasing the playback speed of a segment based on the value of the respective tags.

8. The method of claim 6, wherein the altering the playback speed includes decreasing the playback speed of a segment if said tags have said second value.

9. The method of claim 2, wherein the altering the program playback includes removing a portion of the program and substituting alternative program segment for the removed portion.

10. A method for sharing viewing preferences associated with a program between a community of users, each user being associated with a respective content player, wherein a respective tag is created for segments of a program, each tag having a tag value indicating the opinion of at least one user of the content of the respective program segment, said tags and said program being transmitted to a first user, the method comprising:

receiving the tags by at least the-content player of the first user; and displaying on a TV screen associated with the content player of the first user a graphic display superimposed on the program, with said graphic display and a portion of said program being simultaneously visible to the first user, said graphic display providing during a first segment of the program information from a tag associated with a second segment shown subsequently to said first segment.

11. The method of claim 10, wherein the content player receives the tags from a network server.

12. The method of claim 10, wherein the displayed tags are used by said content to skip portions of a viewed program.

13. The method of claim 12, wherein the skipped portions are skipped automatically by content player based on the respective tag value.

14. The method of claim 10, wherein the displayed tags are used to indicate portions of the program that are more desirable to view.

15. The method of claim 10, wherein the displayed tags are used to indicate portions of the program that are less desirable to view.

16. The method of claim 10, wherein the displayed tags display the information in a binary format.

17. The method of claim 10, wherein the displayed tags display the information in an analog format.

18. The method of claim 10, wherein the tags are generated by a user indicating positive segments and negative segments.

19. The method of claim 10, wherein the user is provided with a feedback device receiving feedback from the user indicating whether the user likes or dislikes the program segments, further comprising monitoring said feedback device and automatically reporting the results of said monitoring to a remote location for generating said plurality of tags.

20. The method of claim 19, wherein monitoring includes tracking the user's eye movement using a camera.

21. The method of claim 19, wherein any of a user's blood pressure, respiration rate, and galvanic skin response are monitored to determine tags.

22. A multimedia player associated with a first user, the first user being a member of an electronic user community, the community generating a first tag and a second tag descriptive of the content of a first portion and a second portion subsequent of said first portion in a program, said first and second tags being generated by the users of the electronic user community to indicate opinions of the users regarding the content of the first and second portions, said multimedia player comprising:

a player unit receiving and presenting the program to the first user, said first portion being presented before the second portion;

a network connection, attached to the player unit, said network connection receiving said first and said second tags; and a control unit configured to perform functions of the player unit and the network connection, wherein the control unit is further configured to display said first and second tags superimposed a display screen as a graphic overlay overlapping and being presented simultaneously with said first portion of said program with at least said second tag being presented during said first portion.

23. The method of claim 22, wherein the tags aggregate the preferences of multiple users.

24. The method of claim 12, wherein the skipped portions of a viewed program are replaced with other content.

25. The method of claim 24, wherein the other content are hot-spot segments from other programs.

26. The method of claim 25, wherein the other content are smart ads.

27. The method of claim 1, wherein the displayed tags display the information in a binary format.

28. The method of claim 1, wherein the displayed tags display the information in an analog format.

29. The method of claim 1, wherein the tags are generated by a user indicating positive segments and negative segments.

30. The player of claim 22 wherein said controller is configured to generate said graphic overlay as a binary representation of said received tags.

31. The player of claim 22 wherein said controller is configured to generate said graphic overlay as an analog signal to represent said received tags.

32. The player of claim 22 further comprising a remote control including a tag selector operated by the user to generate local tags representing the user's opinion regarding respective program segments, wherein said controller is adapted to receive said local tags and send them to a remote location via said network connection.

33. The player of claim 32 further comprising a data storage storing said local tags prior to their transmission.

\* \* \* \* \*